(12) United States Patent
Horn et al.

(10) Patent No.: US 11,792,047 B2
(45) Date of Patent: Oct. 17, 2023

(54) CHANNEL CONDITION SIGNALING

(71) Applicant: QUALCOMM Incorporated, San Diego, CA (US)

(72) Inventors: Idan Michael Horn, Hod Hasharon (IL); Amit Bar-Or Tillinger, Tel-Aviv (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/339,099

(22) Filed: Jun. 4, 2021

(65) Prior Publication Data
US 2022/0393910 A1 Dec. 8, 2022

(51) Int. Cl.
*H04L 25/02* (2006.01)
*H04L 25/03* (2006.01)
*H04W 24/10* (2009.01)

(52) U.S. Cl.
CPC .... *H04L 25/0202* (2013.01); *H04L 25/03012* (2013.01); *H04W 24/10* (2013.01)

(58) Field of Classification Search
CPC .. H04B 7/0617; H04B 7/0619; H04B 7/0626; H04L 25/0202; H04W 72/0413; H04W 72/042
See application file for complete search history.

(56) References Cited

U.S. PATENT DOCUMENTS

| | | | | |
|---|---|---|---|---|
| 11,553,364 | B2* | 1/2023 | Kwon | H04W 24/10 |
| 2009/0175178 | A1* | 7/2009 | Yoon | H04L 1/0026 |
| | | | | 370/252 |
| 2012/0177092 | A1* | 7/2012 | Zirwas | H04W 28/06 |
| | | | | 375/219 |
| 2017/0134187 | A1* | 5/2017 | Chen | H04B 7/0617 |
| 2017/0311296 | A1 | 10/2017 | Onggosanusi et al. | |
| 2018/0091207 | A1 | 3/2018 | Kakishima et al. | |
| 2021/0359727 | A1* | 11/2021 | Kuriyama | H04B 7/0617 |

OTHER PUBLICATIONS

Huawei., et al., "Details of QCL Assumptions and Related RS Design Considerations", 3GPP TSG RAN WG1 NR Ad Hoc. Meeting, R1-1700072, vol. RAN WG1, No. Spokane, USA, Jan. 16, 2017-Jan. 20, 2017, Jan. 16, 2017, XP051207614, 5 Pages, Sections 1-5.
International Search Report and Written Opinion—PCT/US2022/072173—ISA/EPO—dated Sep. 20, 2022.
Li H., et al., "Eavesdropping-Resilient OFDM System using Sorted Subcarrier Interleaving", IEEE Transactions on Wireless Communications, IEEE Service Center, Piscataway, NJ, US, vol. 14, No. 2, Feb. 1, 2015, pp. 1155-1165, XP011572562. 11 Pages, Sections I-VII.

* cited by examiner

*Primary Examiner* — Mansour Oveissi
(74) *Attorney, Agent, or Firm* — Harrity & Harrity LLP

(57) ABSTRACT

Various aspects of the present disclosure generally relate to wireless communication. In some aspects, a user equipment (UE) may receive, from a base station, an indication that one or more channel condition parameters that are associated with uplink channel estimations are to be signaled to the UE to be used for downlink channel estimations. The UE may receive, from the base station, a report of the one or more channel condition parameters that are associated with the uplink channel estimations. Numerous other aspects are described.

30 Claims, 8 Drawing Sheets

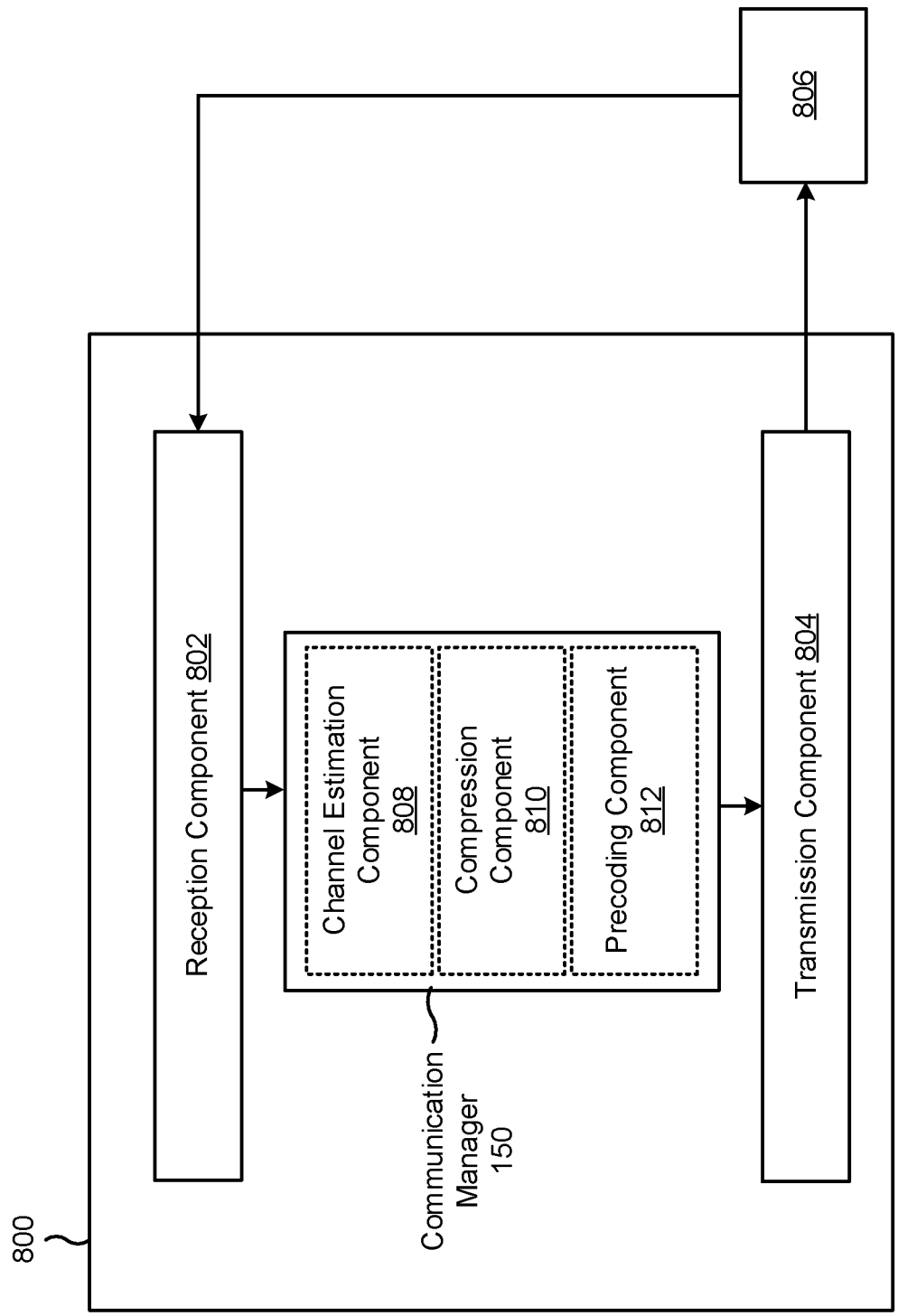

CHANNEL CONDITION SIGNALING

FIELD OF THE DISCLOSURE

Aspects of the present disclosure generally relate to wireless communication and to techniques and apparatuses for channel condition signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams of example apparatuses for wireless communication, in accordance with the present disclosure.

SUMMARY

Figure 1:
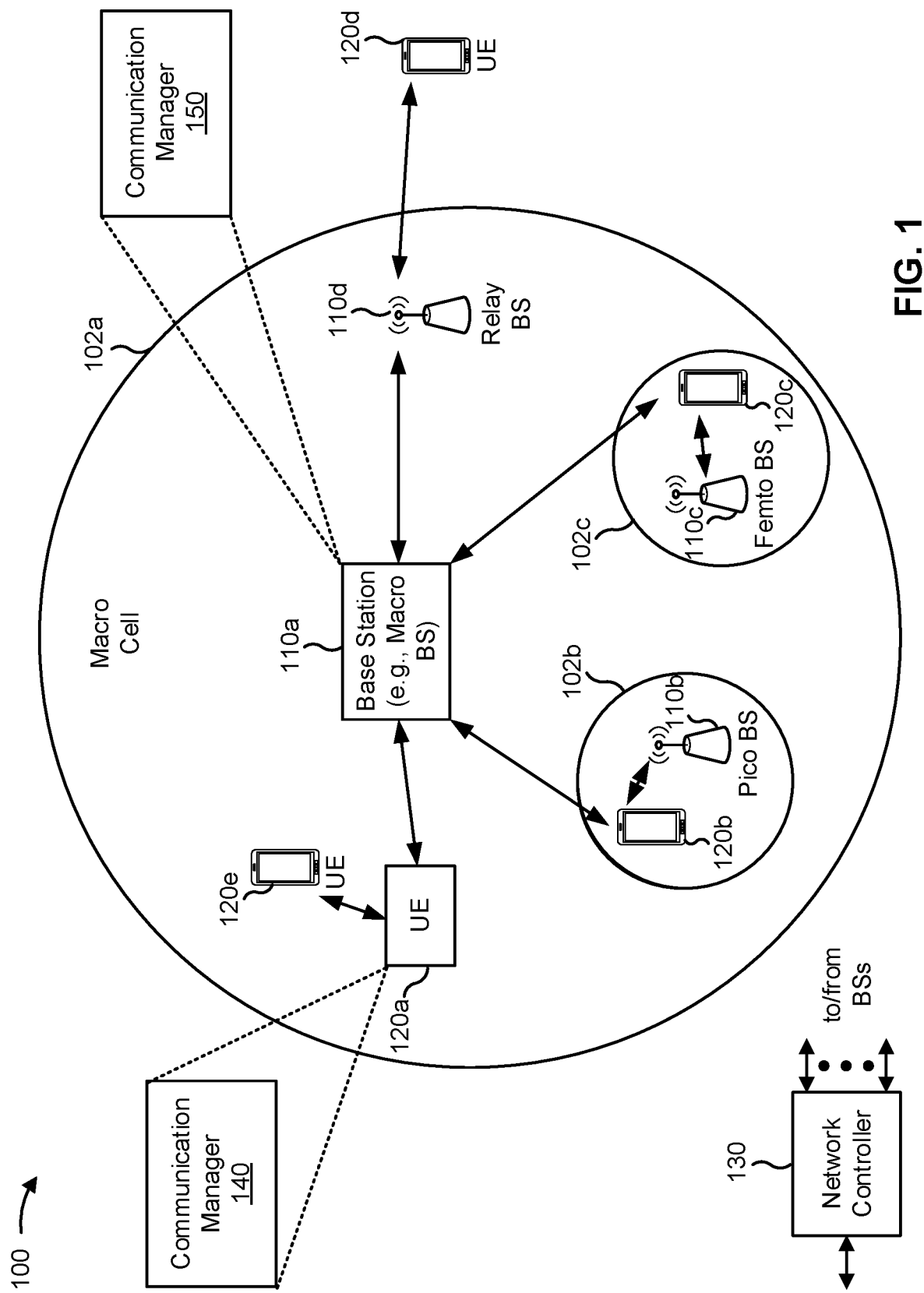
FIG. 1 is a diagram illustrating an example of a wireless network, in accordance with the present disclosure.

In some aspects, a user equipment (UE) for wireless communication includes a memory and one or more processors, coupled to the memory, configured to: receive, from a base station, an indication that one or more channel condition parameters that are associated with uplink channel estimations are to be signaled to the UE to be used for downlink channel estimations; and receive, from the base station, a report of the one or more channel condition parameters that are associated with the uplink channel estimations.

In some aspects, a base station for wireless communication includes a memory and one or more processors, coupled to the memory, configured to: transmit, to a UE, an indication that one or more channel condition parameters that are associated with uplink channel estimations are to be signaled to the UE to be used for downlink channel estimations; receive, from the UE, an uplink signal associated with the uplink channel estimations, wherein the uplink signal is used to estimate the one or more channel condition parameters; and transmit, to the UE, a report of the one or more channel condition parameters that are associated with the uplink channel estimations.

In some aspects, a method of wireless communication performed by a UE includes receiving, from a base station, an indication that one or more channel condition parameters that are associated with uplink channel estimations are to be signaled to the UE to be used for downlink channel estimations; and receiving, from the base station, a report of the one or more channel condition parameters that are associated with the uplink channel estimations.

In some aspects, a method of wireless communication performed by a base station includes transmitting, to a UE, an indication that one or more channel condition parameters that are associated with uplink channel estimations are to be signaled to the UE to be used for downlink channel estimations; receiving, from the UE, an uplink signal associated with the uplink channel estimations, wherein the uplink signal is used to estimate the one or more channel condition parameters; and transmitting, to the UE, a report of the one or more channel condition parameters that are associated with the uplink channel estimations.

In some aspects, a non-transitory computer-readable medium storing a set of instructions for wireless communication includes one or more instructions that, when executed by one or more processors of a UE, cause the UE to: receive, from a base station, an indication that one or more channel condition parameters that are associated with uplink channel estimations are to be signaled to the UE to be used for downlink channel estimations; and receive, from the base station, a report of the one or more channel condition parameters that are associated with the uplink channel estimations.

In some aspects, a non-transitory computer-readable medium storing a set of instructions for wireless communication includes one or more instructions that, when executed by one or more processors of a base station, cause the base station to: transmit, to a UE, an indication that one or more channel condition parameters that are associated with uplink channel estimations are to be signaled to the UE to be used for downlink channel estimations; receive, from the UE, an uplink signal associated with the uplink channel estimations, wherein the uplink signal is used to estimate the one or more channel condition parameters; and transmit, to the UE, a report of the one or more channel condition parameters that are associated with the uplink channel estimations.

In some aspects, an apparatus for wireless communication includes means for receiving, from a base station, an indication that one or more channel condition parameters that are associated with uplink channel estimations are to be signaled to the apparatus to be used for downlink channel estimations; and means for receiving, from the base station, a report of the one or more channel condition parameters that are associated with the uplink channel estimations.

In some aspects, an apparatus for wireless communication includes means for transmitting, to a UE, an indication that one or more channel condition parameters that are associated with uplink channel estimations are to be signaled to the UE to be used for downlink channel estimations; means for receiving, from the UE, an uplink signal associated with the uplink channel estimations, wherein the uplink signal is used to estimate the one or more channel condition parameters; and means for transmitting, to the UE, a report of the one or more channel condition parameters that are associated with the uplink channel estimations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station 110, an indication that one or more channel condition parameters that are associated with uplink channel estimations are to be signaled to the UE to be used for downlink channel estimations; and receive, from the base station 110, a report of the one or more channel condition parameters that are associated with the uplink channel estimations. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, an indication that one or more channel condition parameters that are associated with uplink channel estimations are to be signaled to the UE to be used for downlink channel estimations; receive, from the UE 120, an uplink signal associated with the uplink channel estimations, wherein the uplink signal is used to estimate the one or more channel condition parameters; and transmit, to the UE 120, a report of the one or more channel condition parameters that are associated with the uplink channel estimations. Additionally, or alternatively, the communication manager 150 may perform one or more other operations described herein.

As indicated above, FIG. 1 is provided as an example. Other examples may differ from what is described with regard to FIG. 1.

Figure 2:
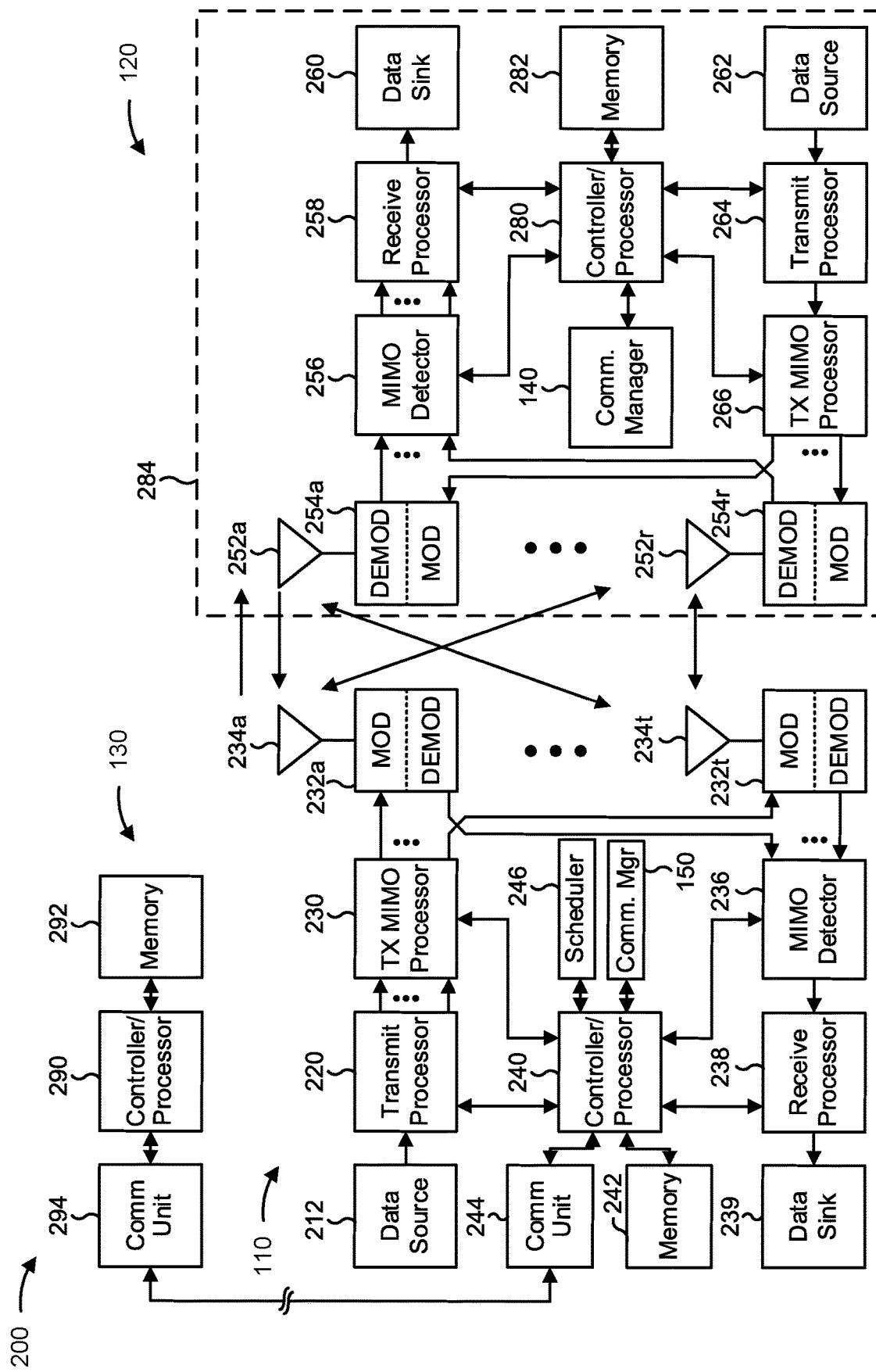
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with channel condition signaling, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving, from a base station, an indication that one or more channel condition parameters that are associated with uplink channel estimations are to be signaled to the UE to be used for downlink channel estimations; and/or means for receiving, from the base station, a report of the one or more channel condition parameters that are associated with the uplink channel estimations. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, an indication that one or more channel condition parameters that are associated with uplink channel estimations are to be signaled to the UE to be used for downlink channel estimations; means for receiving, from the UE, an uplink signal associated with the uplink channel estimations, wherein the uplink signal is used to estimate the one or more channel condition parameters; and/or means for transmitting, to the UE, a report of the one or more channel condition parameters that are associated with the uplink channel estimations. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
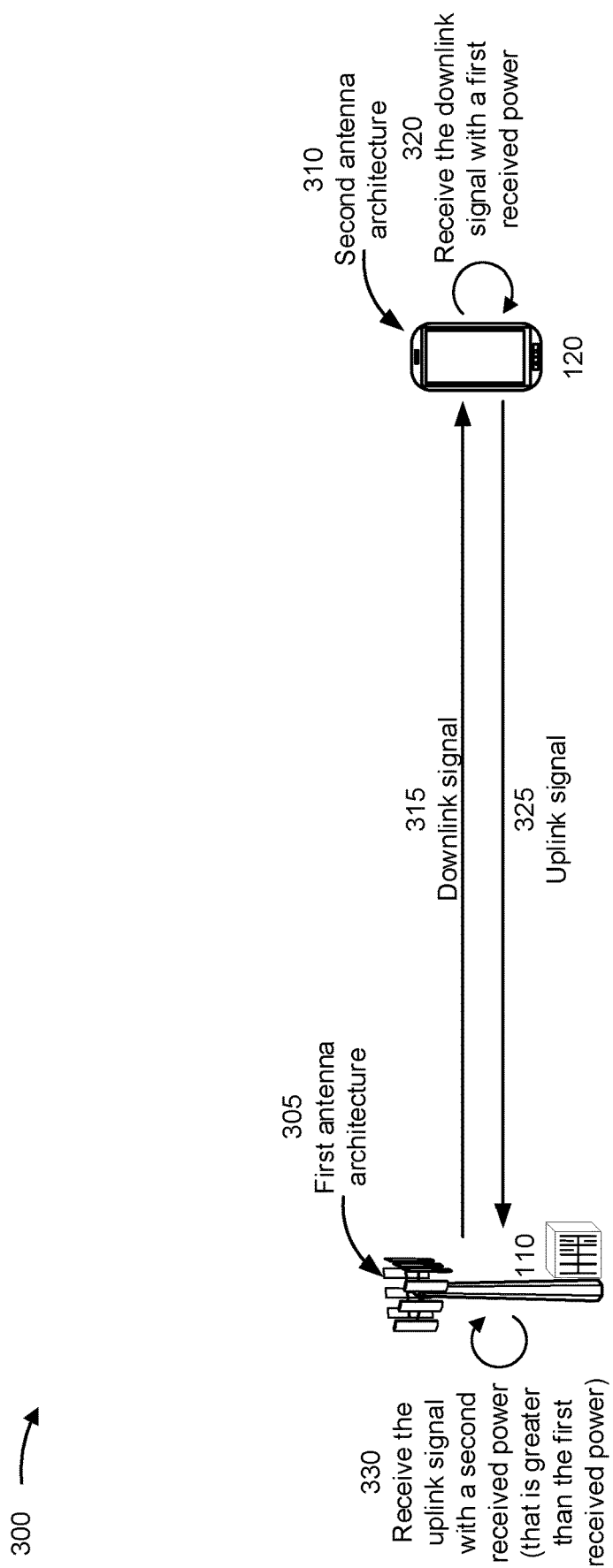
FIG. 3 is a diagram illustrating an example of communication between a UE and a base station using an antenna configuration for high frequency bands, in accordance with the present disclosure.

FIG. 3 is a diagram illustrating an example 300 of communication between a UE and a base station using an antenna configuration for high frequency bands, in accordance with the present disclosure.

In some cases, a UE 120 and a base station 110 may communicate using high frequency bands. For example, the UE 120 and the base station 110 may communicate using millimeter wave bands, the EHF band, FR3, FR4, FR4-a, FR4-1, FR5, and/or frequency bands associated with higher frequencies (e.g., higher than FR5 or other bands mentioned above). The high frequency bands may sometimes be referred to as sub-terahertz (THz) frequency bands. "Sub-THz frequency band" may refer to frequency bands in the range from 100 GHz to 300 GHz, among other examples. Radio frequency (RF) constraints and propagation properties that are unique to the high frequency bands may introduce new design challenges for cellular networks. For example, the high frequency bands may be associated with a high path loss. Therefore, to compensate for the high path loss, the base station 110 and the UE 120 may communicate using narrow beams (e.g., beams with a narrow beam width or signals with energy concentrated over a narrow directional range). In such examples, spatial division multiplexing (SDM) may be used (e.g., where different, spatially separable antenna beams are formed for different UEs).

However, generating narrow beams for a high number of UEs in this manner may use a high number of antennas. For example, traditional antenna configurations or RF front end configurations (such as phased array architectures or sub-array architectures) may require a high number of antennas to support the narrow beams used in the high frequency bands. For example, a phased array architecture may be associated with additional complexity and hardware costs associated with the high number of antennas. A sub-array architecture may be associated with smaller sub-arrays to support the higher number of beams or signal streams that can be supported by the sub-array architecture. However, the smaller sub-arrays may result in reduced performance and a reduced ability to form beams using the sub-array architecture. Therefore, the high number of antennas or antenna arrays to support the high number of beams needed for the high frequency bands may result in higher power consumption (e.g., by the base station 110), higher complexity, and/or a high cost, among other examples.

Another design challenge may be associated with the usage of a single carrier (SC) waveform. An SC waveform may include a discrete Fourier transform spread OFDM (DFT-s-OFDM) waveform, a single carrier time domain (SC-TD) waveform, and/or a single carrier frequency domain (SC-FD) waveform. Compared to OFDM, an SC waveform has lower peak to average power ratio (PAPR) which leads to benefits in power efficiency, link budget enhancement, and low-complexity design. For example, the SC waveform may provide a relatively low PAPR for better coverage and/or a relatively low complexity for reception and transmission (e.g., as compared to the OFDM waveform) in the higher frequency bands. However, traditional multiplexing schemes (e.g., SDM, time division multiplexing (TDM), code division multiplexing (CDM), and/or frequency division multiplexing (FDM)) may not be fully suited to the SC waveform. Additionally, the SC waveform may not provide sufficient flexibility with regard to unequal error protection, and/or unequal bandwidth allocation, among other examples. Moreover, the SC waveform may present additional challenges associated with channel estimation and equalization. For example, a knowledge of a channel delay spread may be needed for efficient channel estimation and equalization of the SC waveform.

Therefore, to address one or more (or all) of the challenges described herein, the base station 110 may use a different antenna configuration or antenna architecture than the UE 120. For example, the base station 110 may use a first antenna architecture 305 and the UE 120 may use a second antenna architecture 310. The first antenna architecture 305 (e.g., used by the base station 110) may be associated with substantially identical transmit and receive power gains, whereas the second antenna architecture 310 (e.g., used by the UE 120) may be associated with different transmit and receive power gains. For example, the first antenna architecture 305 may be associated with a smaller number of antennas for transmitting communications than a number of antennas of the second antenna architecture 310 for transmitting communications. In some aspects, the second antenna architecture 310 may be an antenna array architecture, such as a phased array architecture or a sub-array architecture, among other examples. The second antenna architecture 310 may use multiple antennas for transmitting communications. As a result, signals transmitted by the second antenna architecture 310 may realize a transmit power gain caused by summing power gains added by multiple power amplifiers (e.g., associated with the multiple antennas).

In some examples, the first antenna architecture 305 may be associated with a single antenna (or a small number of antennas) for transmitting communications (e.g., a single transmitting antenna and/or a smaller number of transmitting antennas). For example, the first antenna architecture 305 may be associated with a lens (e.g., an RF lens) or another component (such as a dish) to focus or centralize the energy of a signal (e.g., using refraction). For example, each antenna (or each antenna array) of the first antenna architecture 305 may be associated with an RF lens or another component that focuses or centralizes the energy of a signal transmitted or received by the antenna. For example, an antenna array may be located in a focal place of an RF lens. Each antenna element of the antenna array may generate one beam that can support two layers (e.g., two polarizations) for communication (e.g., using the RF lens). As a result, the base station 110 may be enabled to generate a beam formed signal (e.g., using a narrow beam) that achieves a high effective isotropic radiated power (EIRP) with a single antenna chain (e.g., a single transmit chain). Therefore, the first antenna architecture 305 may achieve high antenna gain (e.g., a high EIRP) and directivity (e.g., spatial directivity) with a lower hardware cost and a lower power consumption (e.g., as a high number of antennas are not needed to achieve the high antenna gain and the high directivity). The first antenna architecture 305 may be referred to as a "lens MIMO architecture," among other examples.

However, the RF lens (or other component) of the first antenna architecture 305 may not be associated with a power gain. For example, the RF lens (or other component) of the first antenna architecture 305 may simply centralize the energy of a signal in a given direction (e.g., to form a beam of the signal). Therefore, the RF lens may be associated with the same energy gain for transmitted signals and for received signals (e.g., as the energy gain is associated with the RF lens centralizing or focusing the energy, rather than another hardware component in an RF chain providing the additional gain). For example, signals transmitted using the first antenna architecture 305 may not realize the benefit of multiple power amplifiers (associated with multiple antennas or antenna elements), as a single antenna may be used to transmit the signal. This may differ from the second antenna architecture 310, which may use multiple antennas or antenna elements to transmit a signal and may therefore realize an additional power gain from multiple power amplifiers associated with the multiple antennas or antenna elements.

For example, as shown by reference number 315, the base station 110 may transmit, and the UE 120 may receive, a downlink signal. The downlink signal may be transmitted using the first antenna architecture 305. As shown by reference number 320, the UE 120 may receive the downlink signal with a first received power (e.g., in decibel-milliwatts (dBm)). As shown by reference number 325, the UE 120 may transmit, and the base station 110 may receive, an uplink signal. The uplink signal may be transmitted using the second antenna architecture 310. As shown by reference number 330, the base station 110 may receive the downlink signal with a second received power. The second received power may be greater than the first received power. For example, because the uplink signal realizes a transmit power gain caused by a summation of power gains from power amplifiers of multiple antennas or antenna elements (e.g., which is not realized by the downlink signal that may be associated with a single power amplifier or a smaller number of power amplifiers than the uplink signal), the uplink signal may be associated with a higher received power than the downlink signal (e.g., when the uplink signal and the downlink signal are transmitted from approximately the same distance with approximately the same channel conditions). For example, a difference between the first received power and the second received power may approximately correspond to a difference in (or a ratio of) a number of antennas used to transmit the uplink signal compared to a number of antennas used to transmit the downlink signal. For example, the difference (in decibels) between the first received power and the second received power may be approximately 10× log n, where n is a difference in (or a ratio of) a number of antennas used to transmit the uplink signal compared to a number of antennas used to transmit the downlink signal. Moreover, downlink signals typically have larger resource allocations than uplink signals. The larger resource allocations may result in higher noise experienced by downlink signals (e.g., compared to uplink signals) which may further degrade the received power of the downlink signal. Therefore, the uplink signal may be associated with improved performance due to the higher received power (e.g., compared to the downlink signal).

In some cases, channel conditions may be determined by the UE 120 using a downlink signal. For example, some wireless networks may assume that downlink signals are associated with better conditions or reliability (e.g., as compared to uplink signals) as the wireless network may assume that a base station is associated with a larger number of antennas than a number of antennas of UEs within the wireless network. For example, a wireless network may assume that downlink signals may be associated with higher received powers (e.g., higher than received powers of uplink signals transmitted from approximately the same distance) because of the larger number of antennas (e.g., and the larger number of power amplifiers). Therefore, UEs within the wireless network may be expected to (or may be configured to) perform channel estimations and synchronization using downlink signals. For example, the UE 120 may measure the downlink signal and may estimate one or more channel condition parameters based at least in part on the downlink signal.

However, in wireless networks where the base station 110 uses an antenna architecture similar to (or the same as) the first antenna architecture 305, downlink signals may be associated with worse conditions or reliability (e.g., as compared to uplink signals) because the downlink signals may be associated with a lower received power than a received power of uplink signals. As a result, channel estimations and synchronization performed using the downlink signal may result in degraded channel estimations because of the reduced received power of the downlink signal. The degraded channel estimations may result in reduced performance, coverage, and/or throughput, among other examples, of the UE 120. Moreover, in wireless networks that use an SC waveform, delay spread estimations using the downlink signal may be degraded or unreliable, resulting in reduced performance and additional complexity associated with communicating using the SC waveform.

Some techniques and apparatuses described herein enable channel condition signaling. For example, the channel condition signaling may be associated with high frequency bands where a base station uses an antenna architecture similar to (or the same as) the first antenna architecture 305 and/or where an SC waveform is used for communications. The base station 110 may signal (e.g., transmit) to a UE that one or more channel condition parameters that are associated with uplink channel estimations (e.g., one or more channel condition parameters estimated by the base station using an uplink signal) are to be signaled to the UE to be used for downlink channel estimations. In other words, the base station may indicate, to the UE, that the UE is to use values for one or more channel condition parameters (e.g., that have been estimated by the base station using an uplink signal) to perform downlink channel estimations and/or channel synchronization. In some aspects, the base station may transmit, and the UE may receive, an indication that reciprocity between an uplink channel and a downlink channel exists. For example, as the base station and the UE may communicate using narrow beams (e.g., because of the high frequency band used by the base station and the UE), reciprocity between the uplink channel and the downlink channel may exist. Therefore, the UE may be enabled to apply channel condition parameter(s) estimated using the uplink channel to channel estimations for the downlink channel.

The base station may transmit, and the UE may receive, a report of the one or more channel condition parameters that are associated with the uplink channel estimations (e.g., a report indicating values for the one or more channel condition parameters). The UE may be enabled to use the values for the one or more channel condition parameters to perform channel estimations and/or channel synchronizations. As a result, the channel condition signaling may optimize a UE channel estimation and synchronization in high frequency bands. For example, the estimations of the one or more channel condition parameters may be improved by using the uplink signal to estimate values for the one or more channel condition parameters. Using improved estimations of the one or more channel condition parameters may improve channel estimations and synchronization loops of the UE, resulting in improved performance, improved coverage, and/or improved throughput, among other examples.

In some aspects, such as where an SC waveform is used, the base station may perform precoding and/or pre-equalization to identify a beam to use to communicate with the UE to reduce an inter-symbol interference value associated with the single carrier waveform. In some aspects, the base station may transmit, to the UE, an indication that channel equalization associated with the uplink channel is associated with single-tap equalization (e.g., based on the base station performing precoding to equalize an uplink channel associated with an uplink signal using the SC waveform). In some aspects, the base station may perform precoding to identify values of one or more coefficients associated with channel equalization for the single carrier waveform. The base station may transmit, to the UE, an indication of values of one or more coefficients associated with channel equalization for the single carrier waveform (e.g., to enable the UE to perform channel equalization for the single carrier waveform based at least in part on the values of the one or more coefficients). As a result, a processing complexity and/or an equalization complexity (e.g., at the UE) associated with the SC waveform may be reduced. Moreover, as the uplink signal may be associated with a higher received power, the equalization of the channel using the SC waveform may be improved because the base station uses the uplink signal to precode and/or pre-equalize the channel.

As indicated above, FIG. 3 is provided as an example. Other examples may differ from what is described with respect to FIG. 3.

Figure 4:
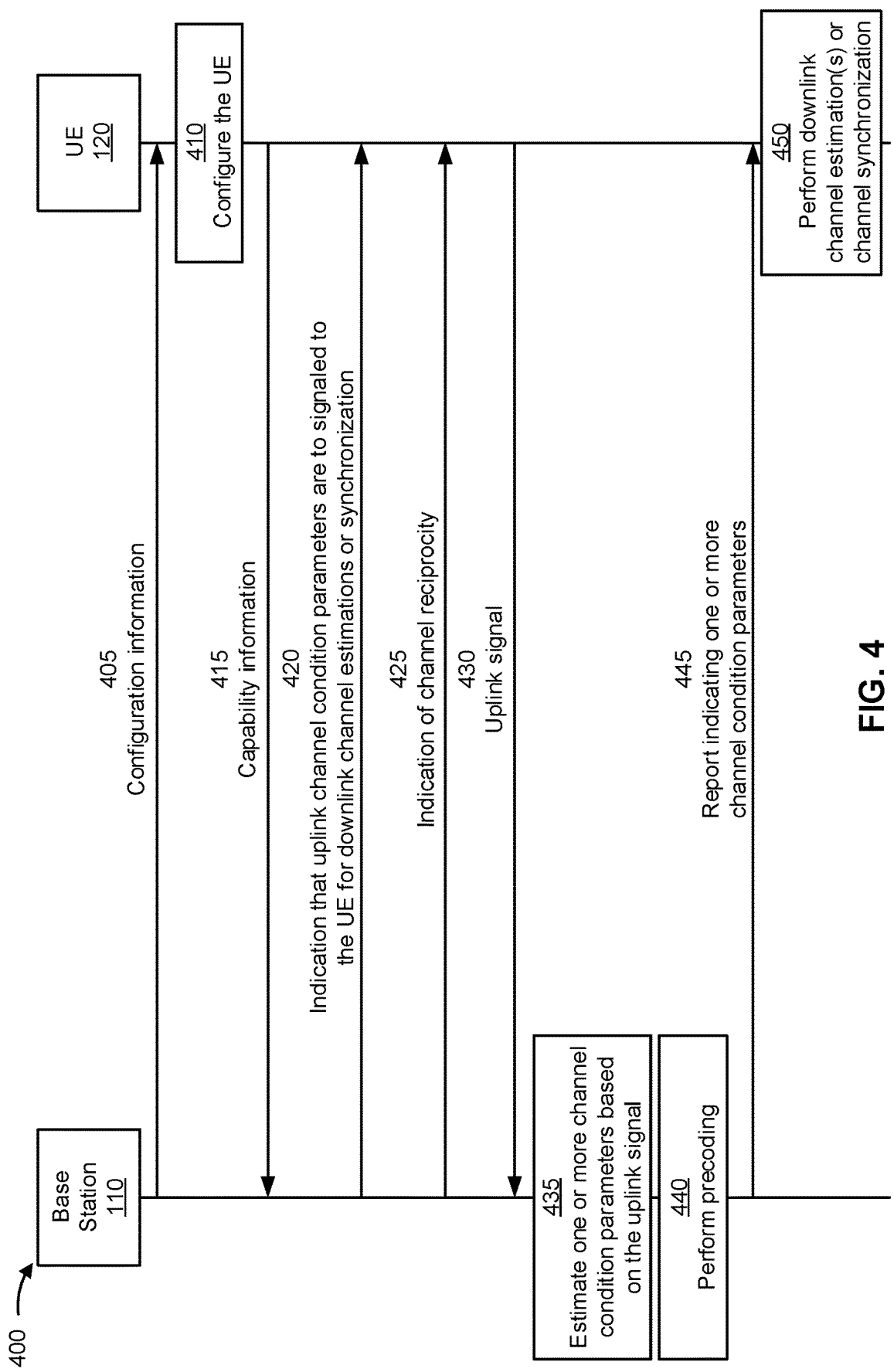
FIG. 4 is a diagram illustrating an example of channel condition signaling, in accordance with the present disclosure.

FIG. 4 is a diagram illustrating an example 400 of channel condition signaling, in accordance with the present disclosure. As shown in FIG. 4, a UE (e.g., a UE 120) may communicate (e.g., transmit an uplink transmission and/or receive a downlink transmission) with a base station (e.g., a base station 110). The UE 120 and the base station 110 may be part of a wireless network (e.g., wireless network 100). As explained in more detail herein, the UE 120 and the base station 110 may communicate to enable the UE 120 to use channel condition parameters that were estimated using an uplink signal (e.g., by the base station 110) for downlink channel estimations and/or downlink channel synchronization.

As shown by reference number 405, the base station 110 may transmit, and the UE 120 may receive, configuration information. In some aspects, the UE 120 may receive configuration information from another device (e.g., from another base station or another UE). In some aspects, the UE 120 may receive the configuration information via radio resource control (RRC) signaling and/or medium access control (MAC) signaling (e.g., MAC control elements (MAC-CEs)). In some aspects, the configuration information may include an indication of one or more configuration parameters (e.g., already known to the UE 120) for selection by the UE 120 and/or explicit configuration information for the UE 120 to use to configure the UE 120.

In some aspects, the configuration information may indicate that the UE 120 is to use values of one or more channel condition parameters that are associated with uplink channel estimations for downlink channel estimations. For example, the UE 120 may be configured to receive an indication that one or more channel condition parameters that are associated with uplink channel estimations (e.g., performed by the base station 110) are to be signaled to the UE 120 to be used for downlink channel estimations. In some aspects, the UE 120 may be configured to receive a report of the one or more channel condition parameters that are associated with the uplink channel estimations. In some aspects, the UE 120 may be configured to perform downlink channel estimations or channel synchronization based at least in part on the one or more channel condition parameters. In some aspects, the configuration information may indicate that reciprocity between an uplink channel and a downlink channel exists.

In some aspects, the configuration information may indicate information for one or more uplink signals that are to be used by the base station 110 for estimating values of the one or more channel condition parameters. For example, the configuration information may indicate a sounding reference signal (SRS) resource configuration (e.g., where the base station 110 uses an SRS transmitted by the UE 120 to estimate values of the one or more channel condition parameters). In some other aspects, the configuration information may indicate a demodulation reference signal (DMRS) configuration and/or a physical uplink shared channel (PUSCH) configuration that is associated with a DMRS configuration (e.g., where the base station 110 uses a DMRS transmitted by the UE 120 to estimate values of the one or more channel condition parameters). In some aspects, the configuration information may indicate that the UE 120 is to transmit an indication of whether the UE 120 supports using values of one or more channel condition parameters that are associated with uplink channel estimations for downlink channel estimations. For example, the UE 120 may be configured to transmit capability information indicating whether the UE 120 is capable of performing downlink channel estimations using the one or more channel condition parameters that are associated with uplink channel estimations.

In some aspects, the configuration information may indicate that the base station 110 may estimate values for one or more channel condition values and may signal, to the UE 120, the estimated values. For example, the base station 110 may be configured to estimate values for one or more channel condition values using an uplink signal. The base station 110 may be configured to transmit, to the UE 120, a report of the one or more channel condition parameters that are associated with the uplink channel estimations. In some aspects, the configuration information may indicate that the base station 110 may perform precoding to identify a beam to use to communicate with the UE to reduce an inter-symbol interference value associated with a single carrier waveform. For example, the base station 110 may be configured to attempt to precode and/or equalize a channel between the UE 120 and the base station 110 (e.g., for an SC waveform). In some aspects, the configuration information may indicate that the base station 110 uses an antenna architecture or configuration that is associated with a single antenna or low number of antennas (e.g., as compared to a number of antennas available for the UE 120 to use for transmitting or receiving communications). For example, the configuration information may indicate that the base station 110 uses a lens MIMO antenna architecture (or an antenna architecture similar to the first antenna architecture 305 described in connection with FIG. 3).

As shown by reference number 410, the UE 120 may configure the UE 120 for communicating with the base station. In some aspects, the UE 120 may configure the UE 120 based at least in part on the configuration information.

In some aspects, the UE 120 may be configured to perform one or more operations described herein.

As shown by reference number 415, the UE 120 may transmit, and the base station 110 may receive, an indication of a capability of the UE 120 to communicate (e.g., one or more of uplink transmissions or downlink transmissions) based at least in part on the channel condition signaling described herein. For example, the UE 120 may transmit capability information indicating whether the UE 120 is capable of performing downlink channel estimations using the one or more channel condition parameters that are associated with uplink channel estimations. In some aspects, the UE 120 may transmit the indication via RRC signaling, one or more MAC-CEs, and/or a physical uplink control channel (PUCCH) message, among other examples.

In some aspects, the UE 120 may transmit, and the base station 110 may receive, an equalization capability of the UE 120. The UE 120 may transmit the equalization capability via an RRC message, and/or an uplink control channel message, among other examples. The equalization capability may indicate a UE support for performing channel equalization. For example, the equalization capability may be associated with a capability of the UE 120 to perform channel equalization, such as when an SC waveform is used by the UE 120 and the base station 110. In some aspects, the equalization capability may indicate a timing accuracy that can be achieved by the UE 120 (e.g., when performing channel equalization). In some aspects, the equalization capability may indicate a number of taps to be used for channel equalization. For example, the UE 120 may perform channel equalization (e.g., in a similar manner as explained in more detail below) and may identify a number of taps to be used for channel equalization. The UE 120 may report, to the base station 110, the number of taps via the equalization capability.

In some aspects, the base station 110 may determine to use channel condition signaling as described herein. In some aspects, the base station may determine to use channel condition signaling as described herein based at least in part on one or more metrics, such as an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE 120 satisfying a threshold, a signal-to-interference-plus-noise ratio (SINR) that satisfies a threshold, and/or a difference between a received power of an uplink signal and a received power of a downlink signal that satisfies a threshold, among other examples. In some aspects, the base station 110 may determine to use channel condition signaling as described herein based at least in part on current metrics and/or predicted metrics. In some aspects, the base station 110 may determine to use channel condition signaling as described herein based at least in part on the capability information indicated by the UE 120. In some aspects, the base station 110 may determine to use channel condition signaling as described herein based at least in part on an antenna architecture or configuration of the base station 110. For example, the base station 110 may determine to use channel condition signaling as described herein based at least in part on a number of antennas available for the base station 110 to transmit a signal (e.g., based at least in part on the number of antennas available for the base station 110 to transmit a signal being less than (or less than by a threshold amount) a number of antennas available for the UE 120 to transmit a signal).

In some aspects, the base station 110 may transmit, and the UE 120 may receive, a request to use channel condition signaling as described herein. In some aspects, the base station 110 may transmit the request via a physical downlink control channel (PDCCH) message (e.g., a downlink control information message), an RRC message, and/or one or more MAC-CEs, among other examples. In some aspects, the request may include an indication that uplink signals are associated with better received power and/or channel conditions than downlink signals and/or an indication that the base station 110 uses an antenna architecture or configuration that is associated with a single antenna or low number of antennas (e.g., as compared to a number of antennas available for the UE 120 to use for transmitting or receiving communications).

For example, as shown by reference number 420, the base station 110 may transmit, and the UE 120 may receive, an indication that one or more channel condition parameters that are associated with uplink channel estimations are to be signaled to the UE to be used for downlink channel estimations. For example, the base station 110 may transmit an indication that the base station 110 uses an antenna architecture or configuration that is associated with a single antenna or a low number of antennas (e.g., as compared to a number of antennas available for the UE 120 to use for transmitting or receiving communications). In some aspects, the base station 110 may transmit an indication that uplink channel estimations may have a higher accuracy (or better channel conditions) than downlink estimations. Therefore, the UE 120 may use values for one or more channel condition parameters for downlink channel estimations that have been estimated (e.g., by the base station 110) using an uplink signal.

In some aspects, the base station 110 may transmit the indication after (or upon) a connection establishment with the UE 120. For example, the base station 110 may transmit the indication after (or upon) successfully completing a random access channel (RACH) procedure with the UE 120 (e.g., a two-step RACH procedure or a four-step RACH procedure). In some aspects, the base station 110 may transmit the indication via an RRC message, one or more MAC-CE messages, and/or a downlink control information (DCI) message, among other examples. The UE 120 may determine, based at least in part on receiving the indication, that the UE 120 is to use values for one or more channel condition parameters that are signaled to the UE 120 (e.g., as described in more detail elsewhere herein) for downlink channel estimations.

In some aspects, as shown by reference number 425, the base station 110 may transmit, and the UE 120 may receive, an indication that there is reciprocity between an uplink channel and a downlink channel. For example, the base station 110 may indicate (by indicating that reciprocity exists) that the UE 120 may use values for the one or more channel condition parameters (e.g., that are estimated using an uplink signal) for downlink channel estimations. In other words, the indication that there is reciprocity between the uplink channel and the downlink channel may enable the UE 120 to use the one or more channel condition parameters for the downlink channel estimations. In some aspects, the base station 110 may transmit the indication that there is reciprocity between the uplink channel and the downlink channel via an RRC message and/or one or more MAC-CE messages, among other examples. In some aspects, the indication that there is reciprocity between the uplink channel and the downlink channel may be a periodic message or an aperiodic message. In some other aspects, the base station 110 may not transmit the indication that reciprocity between an uplink channel and a downlink channel exists. For example, the base station 110 and/or the UE 120 may assume that reciprocity between an uplink channel and a downlink channel exists based at least in part on using channel condition signaling as described herein (e.g., based at least in part on transmitting or receiving the indication that one or more channel condition parameters that are associated with uplink channel estimations are to be signaled to the UE to be used for downlink channel estimations, as described in connection with reference number 420).

As shown by reference number 430, the UE 120 may transmit, and the base station 110 may receive, an uplink signal. In other words, the uplink signal may be used to estimate (e.g., by the base station 110) values for one or more channel condition parameters. The uplink signal may be associated with channel estimations by the base station 110. For example, the UE 120 may be configured (e.g., by the configuration information or by another message) to transmit the uplink signal to enable the base station 110 to perform channel estimations of the uplink channel. In some aspects, the uplink signal may be an SRS or a DMRS (e.g., included in a PUSCH message), among other examples. In some aspects, the UE 120 may be configured (or scheduled) to periodically transmit the uplink signal. In some aspects, the UE 120 may be configured (or scheduled) to aperiodically or dynamically transmit the uplink signal. In some aspects, the base station 110 may use multiple uplink signals to estimate a value for a channel condition parameter.

As shown by reference number 435, the base station 110 may estimate values for one or more channel condition parameters based at least in part on the uplink signal. For example, the base station 110 may measure the uplink signal. The base station 110 may perform uplink channel estimations to obtain information (e.g., values) associated with the one or more channel condition parameters. The one or more channel condition parameters may include any parameter that the UE 120 may use to perform channel estimation for the downlink channel. For example, the one or more channel condition parameters may include a channel delay spread, a timing offset, a frequency offset, a Doppler spread, a Doppler shift, a power delay profile, an RSRP, an RSRQ, an RSSI, an SINR, and/or a signal-to-noise ratio (SNR), among other examples. The base station 110 may measure one or more uplink signals to obtain a value for the one or more channel condition parameters. In some aspects, the base station 110 may indicate (e.g., via the configuration information or another message) which channel condition parameters are to be estimated and signaled (e.g., to the UE 120) by the base station 110.

In some aspects, as shown by reference number 440, the base station 110 may perform precoding for a channel between the UE 120 and the base station 110. For example, the base station 110 may perform precoding when an SC waveform is used to communicate with the UE 120. For example, typically, precoding may be used, in some communications systems, to enable multi-stream transmission in multi-antenna communications with reduced utilization of computing and/or memory resources to decode a transmission by a UE. A UE may provide a precoding matrix indicator (PMI) to provide spatial channel information feedback. The precoding matrix indicator may be associated with a precoding matrix for a particular rank. In conventional precoding configurations, a power (e.g., an RSRP or an SNR) parameter may be selected for precoding of data of the communication, such that the precoding maximizes the power parameter. However, here, the base station 110 may perform precoding to identify a beam to use to communicate with the UE 120 to reduce an inter-symbol interference value associated with the SC waveform (e.g., such that the goal of the precoding is to minimize the inter-symbol interference, rather than to maximize a power parameter).

Performing the precoding in this manner may enable the base station 110 to perform pre-equalization of a channel between the base station 110 and the UE 120. For example, an SC waveform may be associated with increased inter-symbol interference (e.g., compared to an OFDM waveform). A solution to mitigate the inter-symbol interference is to perform pre-equalization (e.g., at the base station 110) by precoding the data to be transmitted via the channel, as described elsewhere herein. For example, the base station 110 may pre-compensate for channel distortion in uplink signals by determining one or more equalization coefficients (e.g., and values associated with the one or more equalization coefficients). The base station 110 may apply the one or more equalization coefficients to attempt to remove channel distortion from signals transmitted over the uplink channel. In some aspects, the base station 110 may determine that equalization (to be performed by the UE 120) may include single tap (e.g., one tap per subcarrier) equalization. "Tap" or "channel tap" may refer to a delay that is to be used by an equalizer for channel equalization (e.g., to simulate the effects of multipath fading, a model used by the UE 120 and/or the base station 110 may include a delay line with one or more taps, with each tap being a point on the delay line corresponding to a given delay). For example, single-tap or one-tap equalization may indicate that a most recently detected symbol may be used to equalize the channel (e.g., one tap of delay). For example, single-tap equalization may indicate that a channel is flat (e.g., is experiencing flat fading). "Flat fading" may refer to a channel condition in which a coherence bandwidth of the channel is larger than the bandwidth of the signal. In other words, all frequency components of a signal may experience the same magnitude of fading (e.g., the same magnitude of variation of an attenuation of a signal).

For example, if the base station 110 determines that single-tap equalization can be used by the UE 120, then the base station 110 may transmit, and the UE 120 may receive, an indication that channel equalization associated with the uplink channel is associated with single-tap equalization. The indication may be a single bit indication. Transmitting the indication that channel equalization associated with the uplink channel is associated with single-tap equalization may reduce equalization power consumption by the UE 120, as the UE 120 may be made aware that the uplink channel is associated with single-tap equalization and may apply single-tap equalization for the downlink channel. This reduces a power consumption and a complexity that would have otherwise been associated with the UE 120 performing channel equalization without the indication from the base station 110. The base station 110 may transmit the indication that channel equalization associated with the uplink channel is associated with single-tap equalization via a DCI message, among other examples.

In some aspects, the base station 110 may determine that single-tap equalization is not sufficient to equalize the uplink channel. The base station 110 may perform processing or precoding to identify values of one or more coefficients (e.g., one or more time domain equalization coefficients) associated with channel equalization for the SC waveform. The base station 110 may transmit, and the UE 120 may receive, an indication of the values of the one or more coefficients associated with channel equalization for the single carrier waveform. The base station 110 may transmit the indication of the values of the one or more coefficients associated with channel equalization for the single carrier waveform via an RRC message or one or more MAC-CE messages, among other examples. Transmitting the indication of the values of the one or more coefficients associated with channel equalization for the single carrier waveform may enable the UE 120 to use the values of the one or more coefficients for channel equalization of the downlink channel. For example, the UE 120 may use the values of the one or more coefficients as a starting point for performing channel equalization and may derive or determine additional coefficients and/or different values for a coefficient of the one or more coefficients. For example, the UE 120 may perform channel equalization for the SC waveform based at least in part on the values of the one or more coefficients. This may reduce a complexity and a power consumption associated with the UE 120 performing channel equalization when communicating using an SC waveform.

As shown by reference number 445, the base station 110 may transmit, and the UE 120 may receive, a report of the one or more channel condition parameters that are associated with the uplink channel estimations (e.g., as estimated by the base station 110). In some aspects, the report may indicate information associated with precoding performed by the base station 110 (e.g., as described in more detail elsewhere herein). The report may be transmitted by the base station 110 via an RRC message or one or more MAC-CE messages, among other examples. In some aspects, base station 110 may transmit a report for each transmit-to-receive channel. In some aspects, the report may be associated with one or more channel taps or a number of bits for each channel tap of the one or more channel taps. The report may be a periodic report (e.g., may be transmitted periodically by the base station 110) and/or may be an aperiodic report (e.g., may be transmitted aperiodically by the base station 110). As described elsewhere herein, the report may indicate values or information for the one or more channel condition parameters estimated or determined by the base station 110.

In some aspects, the base station 110 may transmit, and the UE 120 may receive, a report for each active beam associated with the UE 120 or for each beam available to be used by the UE 120. For example, the UE 120 and/or the base station 110 may be associated with one or more active beams. "Active beam" may refer a beam or a beam pair that is configured to be used for communications between the base station 110 and the UE 120. For example, the base station 110 may configure (e.g., in the configuration information or another message) a set of active beams. In some aspects, the base station 110 may configure a set of beams, a subset of which are active beams. In some aspects, beams included in the set of beams that are not configured as active beams may have the potential of being configured as active beams in the future. Therefore, in some aspects, the base station 110 may transmit a report for each beam included in the set of beams (e.g., that includes active beams and beams that have the potential of being configured as active beams). This may improve beam management by the UE 120 and may reduce a latency associated with a handover procedure, because the UE 120 may receive a report for each active beam and/or for each beam that has the potential of being configured as an active beam (e.g., each beam available to be used by the UE 120).

In some aspects, the base station 110 may perform compression on information to be included in the report prior to transmitting the report. For example, the base station 110 may compress, using a lossless compression technique, information to be included in the report to generate a compressed report. For example, the base station 110 may perform compression for a packet to be transmitted to the decompressor device. For example, the base station 110 may obtain a data block to be transmitted from a transmission buffer and add a sequence number to the data block to form an Ethernet packet, an Internet protocol (IP) packet, a transmission control protocol (TCP) packet, a user datagram protocol (UDP) packet, a real-time transport protocol (RTP) packet, or another type of packet to be transmitted. The base station 110 may perform compression to reduce the size of the packet. In some aspects, the base station 110 may perform header compression to remove the header (e.g., an Ethernet header, an IP header, a TCP header, a UDP header, an RTP header, or another type of header) from the packet and attach a compression sub-header that includes a context identifier. In some aspects, the base station 110 may perform data compression to reduce the size of the packet. The base station 110 may perform the compression based at least in part on a compression protocol or compression technique, such as robust header compression (RoHC), Ethernet header compression (EHC), Huffman coding, and/or another lossless compression technique.

The base station 110 may transmit, and the UE 120 may receive, the compressed report. The UE 120 may decompress the report (e.g., in accordance with the lossless compression technique) to obtain the information included in the report. For example, the UE 120 may receive a packet data unit (PDU) from the base station 110 via a radio interface and may remove a packet data convergence protocol (PDCP) header from the PDU. In cases where the packet is associated with a PDCP service data unit (SDU), the UE 120 may perform deciphering and integrity verification on the packet, and the packet may be stored in a reception buffer where incoming packets may be reordered (e.g., based on sequence number) and/or where duplicate packets may be discarded if the packet is successfully deciphered and passes integrity verification. The UE 120 may perform header decompression for the packets in the reception buffer and/or for packets that are not associated with a PDCP SDU. For example, the UE 120 may obtain a context identifier (e.g., an RoHC context identifier or another type of context identifier) from the packet and match the context identifier to information contained in a full header associated with a previous packet. This may enable the UE 120 to obtain information included in the compressed report. Compressing the information included in the report may reduce a size of the report, thereby conserving resources and overhead associated with transmitting the report.

As shown by reference number 450, the UE 120 may perform downlink channel estimations or channel synchronization based at least in part on the values of the one or more channel condition parameters (e.g., indicated in a report). For example, the UE 120 may apply the values of the one or more channel condition parameters to downlink channel estimations performed by the UE 120. Similarly, the UE 120 may apply the values of the one or more channel condition parameters to downlink channel synchronization performed by the UE 120. Because the one or more channel condition parameters have been estimated (e.g., by the base station 110) using an uplink signal that is associated with a higher received power or better channel conditions than downlink signals, the values of the one or more channel condition parameters may be more accurate and/or more reliable. Therefore, using the values of the one or more channel condition parameters for downlink channel estimations and/or downlink channel synchronization performed by the UE 120 may improve a performance of the UE 120, may improve coverage for the UE 120, and/or may improve a throughput of the UE 120, among other examples. Moreover, the UE 120 may conserve power that would have otherwise been used estimating the values of the one or more channel condition parameters and/or used performing channel equalization (e.g., when an SC waveform is used). Additionally, the UE 120 may be enabled to perform channel equalization for an SC waveform based at least in part on the values of one or more coefficients (e.g., determined by the base station 110 based at least in part on an uplink signal) indicated by the base station 110, thereby decreasing a complexity and a power consumption associated with communicating using the SC waveform.

As indicated above, FIG. 4 is provided as an example. Other examples may differ from what is described with regard to FIG. 4.

Figure 5:
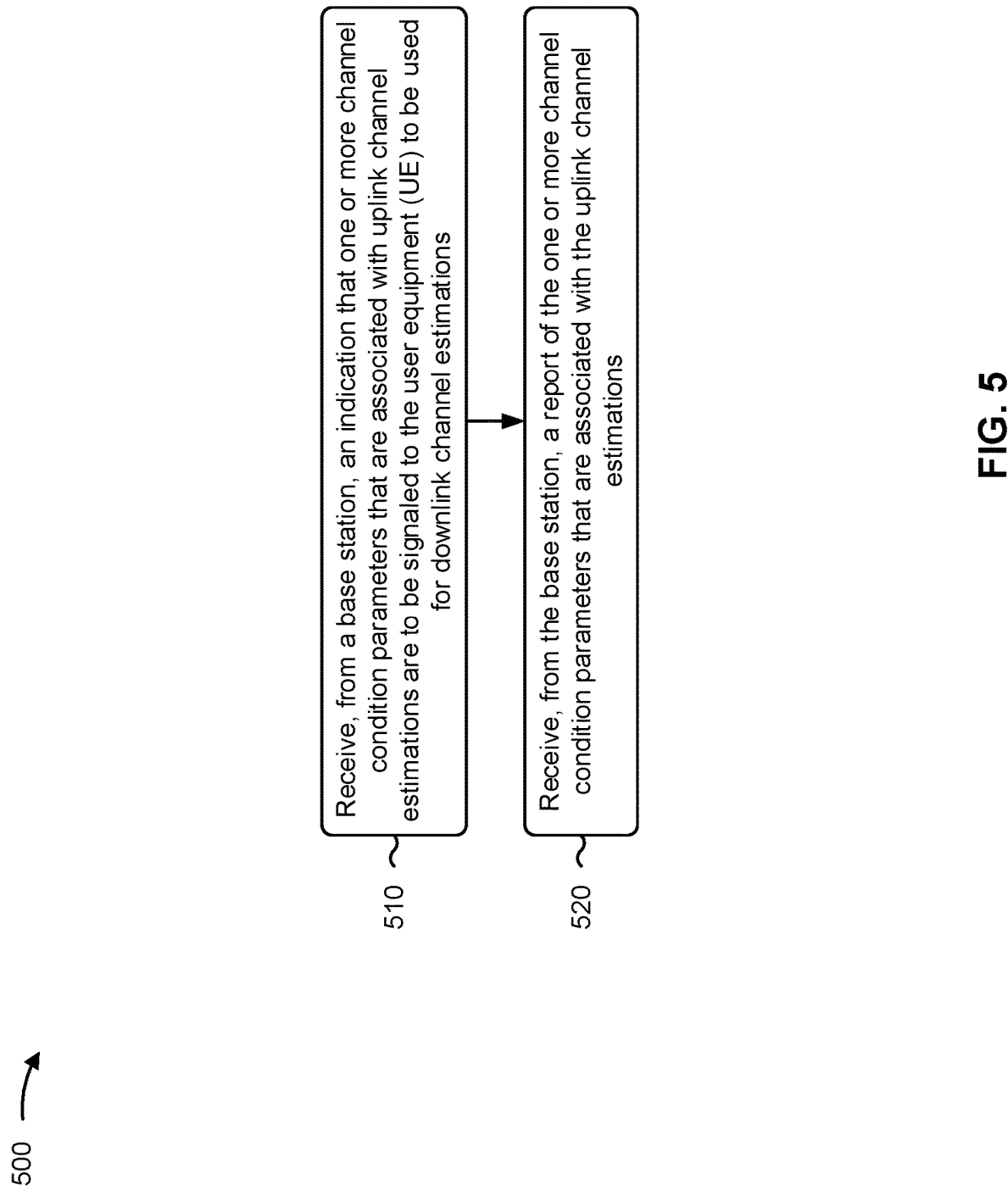
FIGS. 5 and 6 are diagrams illustrating example processes associated with channel condition signaling, in accordance with the present disclosure.

FIG. 5 is a diagram illustrating an example process 500 performed, for example, by a UE, in accordance with the present disclosure. Example process 500 is an example where the UE (e.g., UE 120) performs operations associated with channel condition signaling.

As shown in FIG. 5, in some aspects, process 500 may include receiving, from a base station, an indication that one or more channel condition parameters that are associated with uplink channel estimations are to be signaled to the UE to be used for downlink channel estimations (block 510). For example, the UE (e.g., using communication manager 140 and/or reception component 702, depicted in FIG. 7) may receive, from a base station, an indication that one or more channel condition parameters that are associated with uplink channel estimations are to be signaled to the UE to be used for downlink channel estimations, as described above (e.g., in connection with FIG. 4).

As further shown in FIG. 5, in some aspects, process 500 may include receiving, from the base station, a report of the one or more channel condition parameters that are associated with the uplink channel estimations (block 520). For example, the UE (e.g., using communication manager 140 and/or reception component 702, depicted in FIG. 7) may receive, from the base station, a report of the one or more channel condition parameters that are associated with the uplink channel estimations, as described above (e.g., in connection with FIG. 4).

Process 500 may include additional aspects, such as any single aspect or any combination of aspects described below and/or in connection with one or more other processes described elsewhere herein.

In a first aspect, process 500 includes receiving, from the base station, an indication that there is reciprocity between an uplink channel and a downlink channel, wherein the indication of reciprocity between the uplink channel and the downlink channel indicates to the UE to use the one or more channel condition parameters for the downlink channel estimations.

In a second aspect, alone or in combination with the first aspect, receiving the indication that there is reciprocity between the uplink channel and the downlink channel includes receiving the indication that there is reciprocity between the uplink channel and the downlink channel via at least one of a radio resource control message or a MAC-CE message.

In a third aspect, alone or in combination with one or more of the first and second aspects, receiving the indication that there is reciprocity between the uplink channel and the downlink channel includes receiving the indication that there is reciprocity between the uplink channel and the downlink channel via a periodic message or an aperiodic message.

In a fourth aspect, alone or in combination with one or more of the first through third aspects, receiving the report of the one or more channel condition parameters includes receiving the report via at least one of a radio resource control message or a MAC-CE message.

In a fifth aspect, alone or in combination with one or more of the first through fourth aspects, receiving the report of the one or more channel condition parameters includes receiving the report for each transmit-to-receive channel.

In a sixth aspect, alone or in combination with one or more of the first through fifth aspects, the report is associated with one or more channel taps or a number of bits for each channel tap of the one or more channel taps.

In a seventh aspect, alone or in combination with one or more of the first through sixth aspects, the report is a periodic report or an aperiodic report.

In an eighth aspect, alone or in combination with one or more of the first through seventh aspects, the report is compressed using a lossless compression technique.

In a ninth aspect, alone or in combination with one or more of the first through eighth aspects, the one or more channel condition parameters include at least one of a channel delay spread, a timing offset, a frequency offset, or a power delay profile.

In a tenth aspect, alone or in combination with one or more of the first through ninth aspects, process 500 includes performing the downlink channel estimations or channel synchronization based at least in part on the one or more channel condition parameters.

In an eleventh aspect, alone or in combination with one or more of the first through tenth aspects, the UE and the base station communicate using a single carrier waveform, and process 500 includes receiving, from the base station, an indication that channel equalization associated with an uplink channel is associated with single-tap equalization.

In a twelfth aspect, alone or in combination with one or more of the first through eleventh aspects, receiving the indication that channel equalization associated with the uplink channel is associated with single-tap equalization includes receiving the indication via a downlink control information message.

In a thirteenth aspect, alone or in combination with one or more of the first through twelfth aspects, the UE and the base station communicate using a single carrier waveform, and process 500 includes receiving, from the base station, an indication of values of one or more coefficients associated with channel equalization for the single carrier waveform, and performing the channel equalization for the single carrier waveform based at least in part on the values of the one or more coefficients.

In a fourteenth aspect, alone or in combination with one or more of the first through thirteenth aspects, receiving the indication of the values of the one or more coefficients includes receiving the indication via at least one of a radio resource control message or a MAC-CE message.

In a fifteenth aspect, alone or in combination with one or more of the first through fourteenth aspects, receiving the report of the one or more channel condition parameters includes receiving a report for each active beam associated with the UE or for each beam available to be used by the UE.

In a sixteenth aspect, alone or in combination with one or more of the first through fifteenth aspects, process 500 includes transmitting, to the base station, capability information indicating that the UE is capable of performing downlink channel estimations using the one or more channel condition parameters that are associated with uplink channel estimations.

In a seventeenth aspect, alone or in combination with one or more of the first through sixteenth aspects, the base station is associated with an antenna architecture that is associated with a single antenna, or a lower number of antennas as compared to a number of antennas available for the UE to receive communications, available for the base station to transmit communications.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
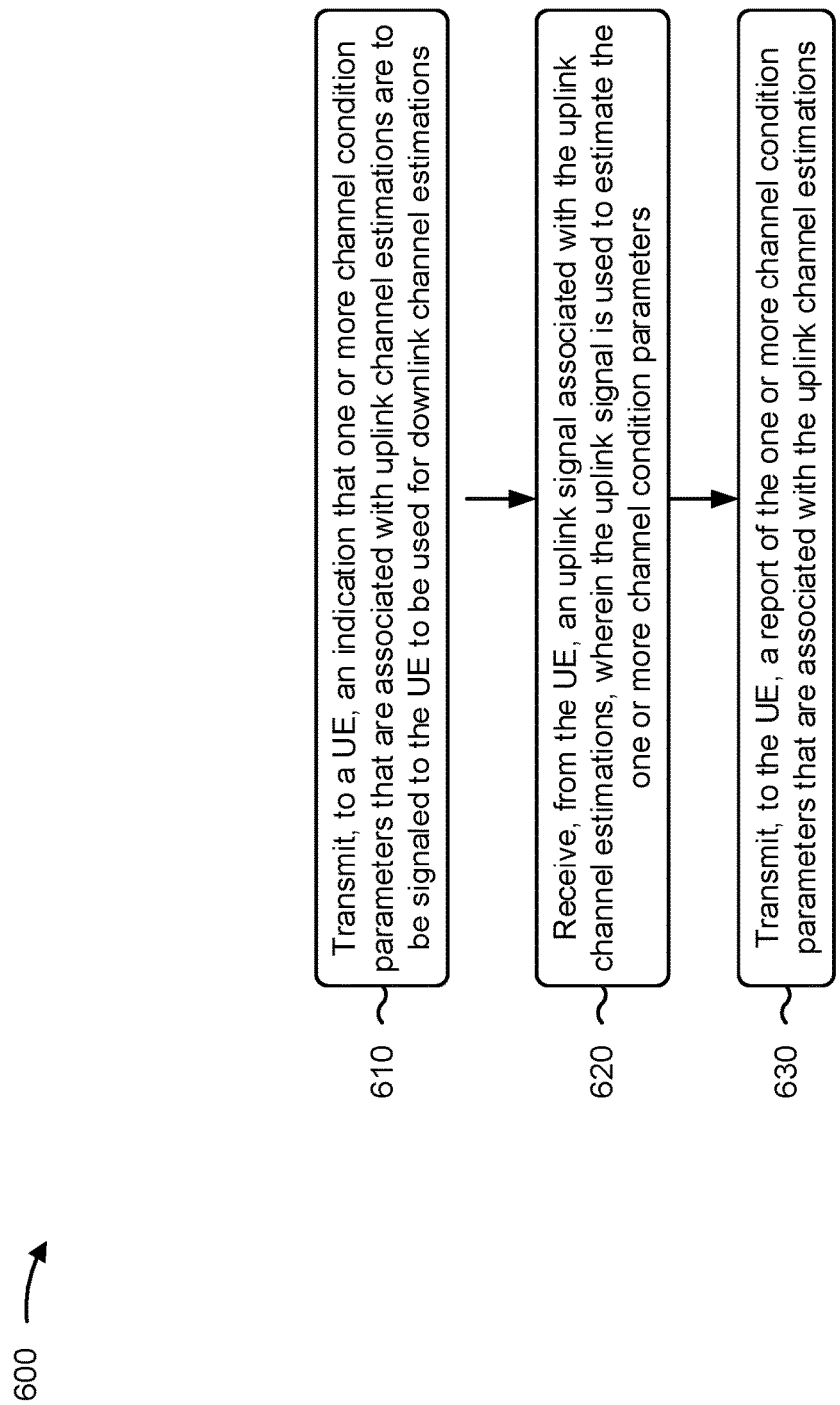

FIG. 6 is a diagram illustrating an example process 600 performed, for example, by a base station, in accordance with the present disclosure. Example process 600 is an example where the base station (e.g., base station 110) performs operations associated with channel condition signaling.

As shown in FIG. 6, in some aspects, process 600 may include transmitting, to a UE, an indication that one or more channel condition parameters that are associated with uplink channel estimations are to be signaled to the UE to be used for downlink channel estimations (block 610). For example, the base station (e.g., using communication manager 150 and/or transmission component 804, depicted in FIG. 8) may transmit, to a UE, an indication that one or more channel condition parameters that are associated with uplink channel estimations are to be signaled to the UE to be used for downlink channel estimations, as described above (e.g., in connection with FIG. 4).

As further shown in FIG. 6, in some aspects, process 600 may include receiving, from the UE, an uplink signal associated with the uplink channel estimations, wherein the uplink signal is used to estimate the one or more channel condition parameters (block 620). For example, the base station (e.g., using communication manager 150 and/or reception component 802, depicted in FIG. 8) may receive, from the UE, an uplink signal associated with the uplink channel estimations, wherein the uplink signal is used to estimate the one or more channel condition parameters, as described above (e.g., in connection with FIG. 4).

As further shown in FIG. 6, in some aspects, process 600 may include transmitting, to the UE, a report of the one or more channel condition parameters that are associated with the uplink channel estimations (block 630). For example, the base station (e.g., using communication manager 150 and/or transmission component 804, depicted in FIG. 8) may transmit, to the UE, a report of the one or more channel condition parameters that are associated with the uplink channel estimations, as described above (e.g., in connection with FIG. 4).

Process 600 may include additional aspects, such as any single aspect or any combination of aspects described below and/or in connection with one or more other processes described elsewhere herein.

In a first aspect, process 600 includes transmitting, to the UE, an indication that there is reciprocity between an uplink channel and a downlink channel, wherein the indication of reciprocity between the uplink channel and the downlink channel indicates to the UE to use the one or more channel condition parameters for the downlink channel estimations.

In a second aspect, alone or in combination with the first aspect, transmitting the indication that there is reciprocity between the uplink channel and the downlink channel includes transmitting the indication that there is reciprocity between the uplink channel and the downlink channel via at least one of a radio resource control message or a MAC-CE message.

In a third aspect, alone or in combination with one or more of the first and second aspects, transmitting the indication that there is reciprocity between the uplink channel and the downlink channel includes transmitting the indication that there is reciprocity between the uplink channel and the downlink channel via a periodic message or an aperiodic message.

In a fourth aspect, alone or in combination with one or more of the first through third aspects, transmitting the report of the one or more channel condition parameters includes transmitting the report via at least one of a radio resource control message or a MAC-CE message.

In a fifth aspect, alone or in combination with one or more of the first through fourth aspects, transmitting the report of the one or more channel condition parameters includes transmitting the report for each transmit-to-receive channel.

In a sixth aspect, alone or in combination with one or more of the first through fifth aspects, the report is associated with one or more channel taps or a number of bits for each channel tap of the one or more channel taps.

In a seventh aspect, alone or in combination with one or more of the first through sixth aspects, the report is a periodic report or an aperiodic report.

In an eighth aspect, alone or in combination with one or more of the first through seventh aspects, the report is a compressed report, and process 600 includes compressing, using a lossless compression technique, information to be included in the report to generate the compressed report.

In a ninth aspect, alone or in combination with one or more of the first through eighth aspects, the one or more channel condition parameters include at least one of a channel delay spread, a timing offset, a frequency offset, or a power delay profile.

In a tenth aspect, alone or in combination with one or more of the first through ninth aspects, process 600 includes performing, using the uplink signal, the uplink channel estimations to obtain information associated with the one or more channel condition parameters.

In an eleventh aspect, alone or in combination with one or more of the first through tenth aspects, the UE and the base station communicate using a single carrier waveform, and process 600 includes performing, based at least in part on the one or more channel condition parameters, precoding to identify a beam to use to communicate with the UE to reduce an inter-symbol interference value associated with the single carrier waveform.

In a twelfth aspect, alone or in combination with one or more of the first through eleventh aspects, the UE and the base station communicate using a single carrier waveform, and process 600 includes performing, based at least in part on the one or more channel condition parameters, precoding to equalize an uplink channel associated with the uplink signal, and transmitting, to the UE based at least in part on performing the precoding to equalize the uplink channel, an indication that channel equalization associated with the uplink channel is associated with single-tap equalization.

In a thirteenth aspect, alone or in combination with one or more of the first through twelfth aspects, transmitting the indication that channel equalization associated with the uplink channel is associated with single-tap equalization includes transmitting the indication via a downlink control information message.

In a fourteenth aspect, alone or in combination with one or more of the first through thirteenth aspects, the UE and the base station communicate using a single carrier waveform, and process 600 includes performing, based at least in part on the one or more channel condition parameters, precoding to identify values of one or more coefficients associated with channel equalization for the single carrier waveform, and transmitting, to the UE, an indication of the values of the one or more coefficients associated with channel equalization for the single carrier waveform.

In a fifteenth aspect, alone or in combination with one or more of the first through fourteenth aspects, transmitting the indication of the values of the one or more coefficients includes transmitting the indication via at least one of a radio resource control message or a MAC-CE message.

In a sixteenth aspect, alone or in combination with one or more of the first through fifteenth aspects, transmitting the report of the one or more channel condition parameters includes transmitting a report for each active beam associated with the UE or for each beam available to be used by the UE.

In a seventeenth aspect, alone or in combination with one or more of the first through sixteenth aspects, process 600 includes receiving, from the UE, capability information indicating that the UE is capable of performing downlink channel estimations using the one or more channel condition parameters that are associated with uplink channel estimations.

In an eighteenth aspect, alone or in combination with one or more of the first through seventeenth aspects, the base station is associated with an antenna architecture that is associated with a single antenna, or a lower number of antennas as compared to a number of antennas available for the UE to receive communications, available for the base station to transmit communications.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
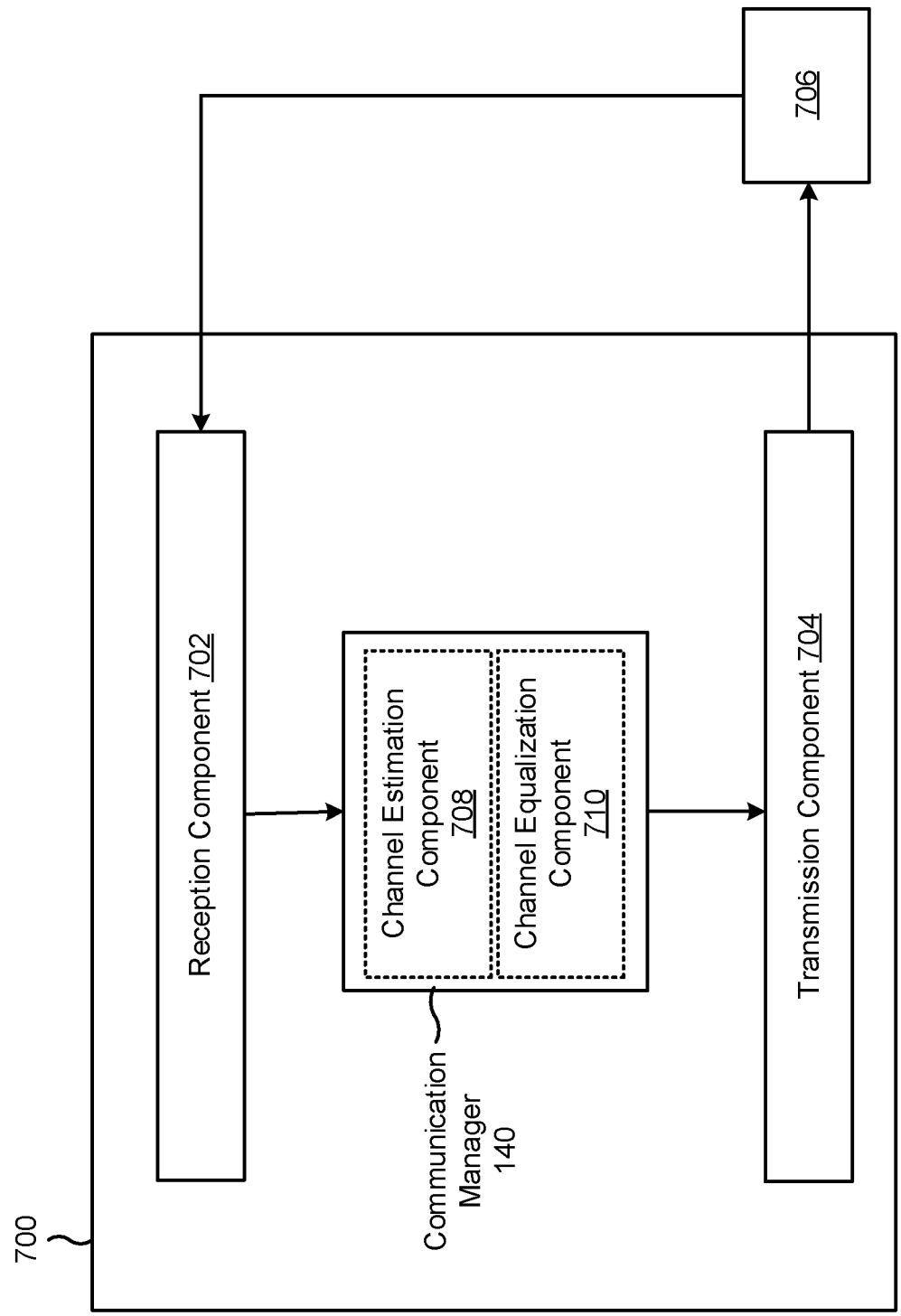

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a channel estimation component 708, and/or a channel equalization component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, from a base station, an indication that one or more channel condition parameters that are associated with uplink channel estimations are to be signaled to the UE to be used for downlink channel estimations. The reception component 702 may receive, from the base station, a report of the one or more channel condition parameters that are associated with the uplink channel estimations.

The reception component 702 may receive, from the base station, an indication that there is reciprocity between an uplink channel and a downlink channel, where the indication of reciprocity between the uplink channel and the downlink channel indicates to the UE to use the one or more channel condition parameters for the downlink channel estimations.

The channel estimation component 708 may perform the downlink channel estimations or channel synchronization based at least in part on the one or more channel condition parameters.

The reception component 702 may receive, from the base station, an indication that channel equalization associated with an uplink channel is associated with single-tap equalization.

The reception component 702 may receive, from the base station, an indication of values of one or more coefficients associated with channel equalization for the single carrier waveform. The channel equalization component 710 may perform channel equalization for the single carrier waveform based at least in part on the values of the one or more coefficients.

The transmission component 704 may transmit, to the base station, capability information indicating that the UE is capable of performing downlink channel estimations using the one or more channel condition parameters that are associated with uplink channel estimations.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include one or more of a channel estimation component 808, a compression component 810, and/or a precoding component 812, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit, to a UE, an indication that one or more channel condition parameters that are associated with uplink channel estimations are to be signaled to the UE to be used for downlink channel estimations. The reception component 802 may receive, from the UE, an uplink signal associated with the uplink channel estimations, wherein the uplink signal is used to estimate the one or more channel condition parameters. The transmission component 804 may transmit, to the UE, a report of the one or more channel condition parameters that are associated with the uplink channel estimations.

The transmission component 804 may transmit, to the UE, an indication that there is reciprocity between an uplink channel and a downlink channel, where the indication of reciprocity between the uplink channel and the downlink channel indicates to the UE to use the one or more channel condition parameters for the downlink channel estimations.

The channel estimation component 808 may perform, using the uplink signal, the uplink channel estimations to obtain information associated with the one or more channel condition parameters.

The compression component 810 may compress, using a lossless compression technique, information to be included in the report to generate a compressed report.

The precoding component 812 may perform, based at least in part on the one or more channel condition parameters, precoding to identify a beam to use to communicate with the UE to reduce an inter-symbol interference value associated with a single carrier waveform. The precoding component 812 may perform, based at least in part on the one or more channel condition parameters, precoding to equalize an uplink channel associated with the uplink signal. The transmission component 804 may transmit, to the UE, based at least in part on performing the precoding to equalize the uplink channel, an indication that channel equalization associated with the uplink channel is associated with single-tap equalization. The precoding component 812 may perform, based at least in part on the one or more channel condition parameters, precoding to identify values of one or more coefficients associated with channel equalization for the single carrier waveform. The transmission component 804 may transmit, to the UE, an indication of the values of the one or more coefficients associated with channel equalization for the single carrier waveform.

The reception component 802 may receive, from the UE, capability information indicating that the UE is capable of performing downlink channel estimations using the one or more channel condition parameters that are associated with uplink channel estimations.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a base station, an indication that one or more channel condition parameters that are associated with uplink channel estimations are to be signaled to the UE to be used for downlink channel estimations; and receiving, from the base station, a report of the one or more channel condition parameters that are associated with the uplink channel estimations.

Aspect 2: The method of Aspect 1, further comprising: receiving, from the base station, an indication that there is reciprocity between an uplink channel and a downlink channel, wherein the indication of reciprocity between the uplink channel and the downlink channel indicates to the UE to use the one or more channel condition parameters for the downlink channel estimations.

Aspect 3: The method of Aspect 2, wherein receiving the indication that there is reciprocity between the uplink channel and the downlink channel comprises receiving the indication that there is reciprocity between the uplink channel and the downlink channel via at least one of a radio resource control message or a medium access control (MAC) control element (MAC-CE) message.

Aspect 4: The method of any of Aspects 2-3, wherein receiving the indication that there is reciprocity between the uplink channel and the downlink channel comprises receiving the indication that there is reciprocity between the uplink channel and the downlink channel via a periodic message or an aperiodic message.

Aspect 5: The method of any of Aspects 1-4, wherein receiving the report of the one or more channel condition parameters comprises receiving the report via at least one of a radio resource control message or a medium access control (MAC) control element (MAC-CE) message.

Aspect 6: The method of any of Aspects 1-5, wherein receiving the report of the one or more channel condition parameters comprises receiving the report for each transmit-to-receive channel.

Aspect 7: The method of any of Aspects 1-6, wherein the report is associated with one or more channel taps or a number of bits for each channel tap of the one or more channel taps.

Aspect 8: The method of any of Aspects 1-7, wherein the report is a periodic report or an aperiodic report.

Aspect 9: The method of any of Aspects 1-8, wherein the report is compressed using a lossless compression technique.

Aspect 10: The method of any of Aspects 1-9, wherein the one or more channel condition parameters include at least one of: a channel delay spread, a timing offset, a frequency offset, or a power delay profile.

Aspect 11: The method of any of Aspects 1-10, further comprising: performing the downlink channel estimations or channel synchronization based at least in part on the one or more channel condition parameters.

Aspect 12: The method of any of Aspects 1-11, wherein the UE and the base station communicate using a single carrier waveform, the method further comprising: receiving, from the base station, an indication that channel equalization associated with an uplink channel is associated with single-tap equalization.

Aspect 13: The method of Aspect 12, wherein receiving the indication that channel equalization associated with the uplink channel is associated with single-tap equalization comprises receiving the indication via a downlink control information message.

Aspect 14: The method of any of Aspects 1-13, wherein the UE and the base station communicate using a single carrier waveform, the method further comprising: receiving, from the base station, an indication of values of one or more coefficients associated with channel equalization for the single carrier waveform; and performing the channel equalization for the single carrier waveform based at least in part on the values of the one or more coefficients.

Aspect 15: The method of Aspect 14, wherein receiving the indication of the values of the one or more coefficients comprises receiving the indication via at least one of a radio resource control message or a medium access control (MAC) control element (MAC-CE) message.

Aspect 16: The method of any of Aspects 1-15, wherein receiving the report of the one or more channel condition parameters comprises receiving a report for each active beam associated with the UE or for each beam available to be used by the UE.

Aspect 17: The method of any of Aspects 1-16, further comprising: transmitting, to the base station, capability information indicating that the UE is capable of performing downlink channel estimations using the one or more channel condition parameters that are associated with uplink channel estimations.

Aspect 18: The method of any of Aspects 1-17, wherein the base station is associated with an antenna architecture that is associated with a single antenna, or a lower number of antennas as compared to a number of antennas available for the UE to receive communications, available for the base station to transmit communications.

Aspect 19: A method of wireless communication performed by a base station, comprising: transmitting, to a user equipment (UE), an indication that one or more channel condition parameters that are associated with uplink channel estimations are to be signaled to the UE to be used for downlink channel estimations; receiving, from the UE, an uplink signal associated with the uplink channel estimations, wherein the uplink signal is used to estimate the one or more channel condition parameters; and transmitting, to the UE, a report of the one or more channel condition parameters that are associated with the uplink channel estimations.

Aspect 20: The method of Aspect 19, further comprising: transmitting, to the UE, an indication that there is reciprocity between an uplink channel and a downlink channel, wherein the indication of reciprocity between the uplink channel and the downlink channel indicates to the UE to use the one or more channel condition parameters for the downlink channel estimations.

Aspect 21: The method of Aspect 20, wherein transmitting the indication that there is reciprocity between the uplink channel and the downlink channel comprises transmitting the indication that there is reciprocity between the uplink channel and the downlink channel via at least one of a radio resource control message or a medium access control (MAC) control element (MAC-CE) message.

Aspect 22: The method of any of Aspects 20-21, wherein transmitting the indication that there is reciprocity between the uplink channel and the downlink channel comprises transmitting the indication that there is reciprocity between the uplink channel and the downlink channel via a periodic message or an aperiodic message.

Aspect 23: The method of any of Aspects 19-22, wherein transmitting the report of the one or more channel condition parameters comprises transmitting the report via at least one of a radio resource control message or a medium access control (MAC) control element (MAC-CE) message.

Aspect 24: The method of any of Aspects 19-23, wherein transmitting the report of the one or more channel condition parameters comprises transmitting the report for each transmit-to-receive channel.

Aspect 25: The method of any of Aspects 19-24, wherein the report is associated with one or more channel taps or a number of bits for each channel tap of the one or more channel taps.

Aspect 26: The method of any of Aspects 19-25, wherein the report is a periodic report or an aperiodic report.

Aspect 27: The method of any of Aspects 19-26, wherein the report is a compressed report, the method further comprising: compressing, using a lossless compression technique, information to be included in the report to generate the compressed report.

Aspect 28: The method of any of Aspects 19-27, wherein the one or more channel condition parameters include at least one of: a channel delay spread, a timing offset, a frequency offset, or a power delay profile.

Aspect 29: The method of any of Aspects 19-28, further comprising: performing, using the uplink signal, the uplink channel estimations to obtain information associated with the one or more channel condition parameters.

Aspect 30: The method of any of Aspects 19-29, wherein the UE and the base station communicate using a single carrier waveform, the method further comprising: performing, based at least in part on the one or more channel condition parameters, precoding to identify a beam to use to communicate with the UE to reduce an inter-symbol interference value associated with the single carrier waveform.

Aspect 31: The method of any of Aspects 19-30, wherein the UE and the base station communicate using a single carrier waveform, the method further comprising: performing, based at least in part on the one or more channel condition parameters, precoding to equalize an uplink channel associated with the uplink signal; and transmitting, to the UE based at least in part on performing the precoding to equalize the uplink channel, an indication that channel equalization associated with the uplink channel is associated with single-tap equalization.

Aspect 32: The method of Aspect 31, wherein transmitting the indication that channel equalization associated with the uplink channel is associated with single-tap equalization comprises transmitting the indication via a downlink control information message.

Aspect 33: The method of any of Aspects 19-32, wherein the UE and the base station communicate using a single carrier waveform, the method further comprising: performing, based at least in part on the one or more channel condition parameters, precoding to identify values of one or more coefficients associated with channel equalization for the single carrier waveform; and transmitting, to the UE, an indication of the values of the one or more coefficients associated with channel equalization for the single carrier waveform.

Aspect 34: The method of Aspect 33, wherein transmitting the indication of the values of the one or more coefficients comprises transmitting the indication via at least one of a radio resource control message or a medium access control (MAC) control element (MAC-CE) message.

Aspect 35: The method of any of Aspects 19-34, wherein transmitting the report of the one or more channel condition parameters comprises transmitting a report for each active beam associated with the UE or for each beam available to be used by the UE.

Aspect 36: The method of any of Aspects 19-35, further comprising: receiving, from the UE, capability information indicating that the UE is capable of performing downlink channel estimations using the one or more channel condition parameters that are associated with uplink channel estimations.

Aspect 37: The method of any of Aspects 19-36, wherein the base station is associated with an antenna architecture that is associated with a single antenna, or a lower number of antennas as compared to a number of antennas available for the UE to receive communications, available for the base station to transmit communications.

Aspect 38: An apparatus for wireless communication at a device, comprising a processor; memory coupled with the processor; and instructions stored in the memory and executable by the processor to cause the apparatus to perform the method of one or more of Aspects 1-18.

Aspect 39: A device for wireless communication, comprising a memory and one or more processors coupled to the memory, the one or more processors configured to perform the method of one or more of Aspects 1-18.

Aspect 40: An apparatus for wireless communication, comprising at least one means for performing the method of one or more of Aspects 1-18.

Aspect 41: A non-transitory computer-readable medium storing code for wireless communication, the code comprising instructions executable by a processor to perform the method of one or more of Aspects 1-18.

Aspect 42: A non-transitory computer-readable medium storing a set of instructions for wireless communication, the set of instructions comprising one or more instructions that, when executed by one or more processors of a device, cause the device to perform the method of one or more of Aspects 1-18.

Aspect 43: An apparatus for wireless communication at a device, comprising a processor; memory coupled with the processor; and instructions stored in the memory and executable by the processor to cause the apparatus to perform the method of one or more of Aspects 19-37.

Aspect 44: A device for wireless communication, comprising a memory and one or more processors coupled to the memory, the one or more processors configured to perform the method of one or more of Aspects 19-37.

Aspect 45: An apparatus for wireless communication, comprising at least one means for performing the method of one or more of Aspects 19-37.

Aspect 46: A non-transitory computer-readable medium storing code for wireless communication, the code comprising instructions executable by a processor to perform the method of one or more of Aspects 19-37.

Aspect 47: A non-transitory computer-readable medium storing a set of instructions for wireless communication, the set of instructions comprising one or more instructions that, when executed by one or more processors of a device, cause the device to perform the method of one or more of Aspects 19-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive, from a base station, an indication that one or more channel condition parameters that are associated with uplink channel estimations are to be signaled to the UE to be used for downlink channel estimations; and
   receive, from the base station, a report, for each beam of a set of beams, the report for each beam indicating the one or more channel condition parameters that are associated with the uplink channel estimations, the set of beams corresponding to each active beam associated with the UE or each beam available to be used by the UE.

2. The UE of claim 1, wherein the one or more processors are further configured to:
   receive, from the base station, an indication that there is reciprocity between an uplink channel and a downlink channel, wherein the indication of reciprocity between the uplink channel and the downlink channel indicates to the UE to use the one or more channel condition parameters for the downlink channel estimations.

3. The UE of claim 1, wherein the one or more processors, to receive the report of the one or more channel condition parameters, are configured to receive the report for each transmit-to-receive channel, for one or more channel taps, or for a number of bits for each channel tap of the one or more channel taps.

4. The UE of claim 1, wherein the one or more processors are further configured to:
   perform the downlink channel estimations or channel synchronization based at least in part on the one or more channel condition parameters.

5. The UE of claim 1, wherein the UE and the base station communicate using a single carrier waveform, and wherein the one or more processors are further configured to:
   receive, from the base station, an indication that a channel equalization associated with an uplink channel is associated with a single-tap equalization.

6. The UE of claim 1, wherein the UE and the base station communicate using a single carrier waveform, and wherein the one or more processors are further configured to:
   receive, from the base station, an indication of values of one or more coefficients associated with a channel equalization for the single carrier waveform; and perform the channel equalization for the single carrier waveform based at least in part on the values of the one or more coefficients.

7. The UE of claim 1, wherein the report is a compressed report that is generated using a lossless compression technique.

8. A base station for wireless communication, comprising:
a memory; and
one or more processors, coupled to the memory, configured to:
transmit, to a user equipment (UE), an indication that one or more channel condition parameters that are associated with uplink channel estimations are to be signaled to the UE to be used for downlink channel estimations;
receive, from the UE, an uplink signal associated with the uplink channel estimations, wherein the uplink signal is used to estimate the one or more channel condition parameters; and
transmit, to the UE, a report, for each beam of a set of beams, the report for each beam indicating the one or more channel condition parameters that are associated with the uplink channel estimations, the set of beams corresponding to each active beam associated with the UE or each beam available to be used by the UE.

9. The base station of claim 8, wherein the one or more processors are further configured to:
transmit, to the UE, an indication that there is reciprocity between an uplink channel and a downlink channel, wherein the indication of reciprocity between the uplink channel and the downlink channel indicates to the UE to use the one or more channel condition parameters for the downlink channel estimations.

10. The base station of claim 8, wherein the report is a compressed report, and wherein the one or more processors are further configured to:
compress, using a lossless compression technique, information to be included in the report to generate the compressed report.

11. The base station of claim 8, wherein the one or more processors are further configured to:
perform, using the uplink signal, the uplink channel estimations to obtain information associated with the one or more channel condition parameters.

12. The base station of claim 8, wherein the UE and the base station communicate using a single carrier waveform, and wherein the one or more processors are further configured to:
perform, based at least in part on the one or more channel condition parameters, precoding to identify a beam to use to communicate with the UE to reduce an inter-symbol interference value associated with the single carrier waveform.

13. The base station of claim 8, wherein the UE and the base station communicate using a single carrier waveform, and wherein the one or more processors are further configured to:
perform, based at least in part on the one or more channel condition parameters, precoding to equalize an uplink channel associated with the uplink signal; and
transmit, to the UE based at least in part on performing the precoding to equalize the uplink channel, an indication that a channel equalization associated with the uplink channel is associated with a single-tap equalization.

14. The base station of claim 8, wherein the UE and the base station communicate using a single carrier waveform, and wherein the one or more processors are further configured to:
perform, based at least in part on the one or more channel condition parameters, precoding to identify values of one or more coefficients associated with a channel equalization for the single carrier waveform; and
transmit, to the UE, an indication of the values of the one or more coefficients associated with the channel equalization for the single carrier waveform.

15. The base station of claim 8, wherein the one or more processors are further configured to:
receive, from the UE, capability information indicating that the UE is capable of performing downlink channel estimations using the one or more channel condition parameters that are associated with uplink channel estimations.

16. A method of wireless communication performed by a user equipment (UE), comprising:
receiving, from a base station, an indication that one or more channel condition parameters that are associated with uplink channel estimations are to be signaled to the UE to be used for downlink channel estimations; and
receiving, from the base station, a report, for each beam of a set of beams, the report for each beam indicating the one or more channel condition parameters that are associated with the uplink channel estimations, the set of beams corresponding to each active beam associated with the UE or each beam available to be used by the UE.

17. The method of claim 16, further comprising:
receiving, from the base station, an indication that there is reciprocity between an uplink channel and a downlink channel, wherein the indication of reciprocity between the uplink channel and the downlink channel indicates to the UE to use the one or more channel condition parameters for the downlink channel estimations.

18. The method of claim 16, wherein receiving the report of the one or more channel condition parameters comprises receiving the report for each transmit-to-receive channel, for one or more channel taps, or for a number of bits for each channel tap of the one or more channel taps.

19. The method of claim 16, further comprising:
performing the downlink channel estimations or channel synchronization based at least in part on the one or more channel condition parameters.

20. The method of claim 16, wherein the UE and the base station communicate using a single carrier waveform, the method further comprising:
receiving, from the base station, an indication that a channel equalization associated with an uplink channel is associated with a single-tap equalization.

21. The method of claim 16, wherein the UE and the base station communicate using a single carrier waveform, the method further comprising:
receiving, from the base station, an indication of values of one or more coefficients associated with a channel equalization for the single carrier waveform; and
performing the channel equalization for the single carrier waveform based at least in part on the values of the one or more coefficients.

22. The method of claim 16, wherein the report is a compressed report that is generated using a lossless compression technique.

23. A method of wireless communication performed by a base station, comprising:
- transmitting, to a user equipment (UE), an indication that one or more channel condition parameters that are associated with uplink channel estimations are to be signaled to the UE to be used for downlink channel estimations;
- receiving, from the UE, an uplink signal associated with the uplink channel estimations, wherein the uplink signal is used to estimate the one or more channel condition parameters; and
- transmitting, to the UE, a report, for each beam of a set of beams, the report for each beam indicating the one or more channel condition parameters that are associated with the uplink channel estimations, the set of beams corresponding to each active beam associated with the UE or each beam available to be used by the UE.

24. The method of claim 23, further comprising:
- transmitting, to the UE, an indication that there is reciprocity between an uplink channel and a downlink channel, wherein the indication of reciprocity between the uplink channel and the downlink channel indicates to the UE to use the one or more channel condition parameters for the downlink channel estimations.

25. The method of claim 23, wherein the report is a compressed report, the method further comprising:
- compressing, using a lossless compression technique, information to be included in the report to generate the compressed report.

26. The method of claim 23, further comprising:
- performing, using the uplink signal, the uplink channel estimations to obtain information associated with the one or more channel condition parameters.

27. The method of claim 23, wherein the UE and the base station communicate using a single carrier waveform, the method further comprising:
- performing, based at least in part on the one or more channel condition parameters, precoding to identify a beam to use to communicate with the UE to reduce an inter-symbol interference value associated with the single carrier waveform.

28. The method of claim 23, wherein the UE and the base station communicate using a single carrier waveform, the method further comprising:
- performing, based at least in part on the one or more channel condition parameters, precoding to equalize an uplink channel associated with the uplink signal; and
- transmitting, to the UE based at least in part on performing the precoding to equalize the uplink channel, an indication that a channel equalization associated with the uplink channel is associated with a single-tap equalization.

29. The method of claim 23, wherein the UE and the base station communicate using a single carrier waveform, the method further comprising:
- performing, based at least in part on the one or more channel condition parameters, precoding to identify values of one or more coefficients associated with a channel equalization for the single carrier waveform; and
- transmitting, to the UE, an indication of the values of the one or more coefficients associated with the channel equalization for the single carrier waveform.

30. The method of claim 23, further comprising:
- receiving, from the UE, capability information indicating that the UE is capable of performing downlink channel estimations using the one or more channel condition parameters that are associated with uplink channel estimations.

* * * * *